United States Patent [19]
Cottrell

[11] 3,710,223
[45] Jan. 9, 1973

[54] POSITION CONTROL SYSTEM RESOLVER

[75] Inventor: George B. Cottrell, Cerritos, Calif. 90701

[73] Assignee: North American Rockwell Corporation

[22] Filed: Aug. 27, 1971

[21] Appl. No.: 175,744

Related U.S. Application Data

[63] Continuation of Ser. No. 14,405, Feb. 26, 1970, abandoned.

[52] U.S. Cl. ................. 318/661, 318/654, 318/594, 318/621
[51] Int. Cl. ............................................ G05b 1/06
[58] Field of Search.............. 318/594, 661, 654, 621

[56] References Cited

UNITED STATES PATENTS

| 2,947,929 | 8/1960 | Bower | 318/594 |
| 3,051,942 | 8/1962 | Galman | 318/594 |
| 3,473,098 | 10/1969 | Waller | 318/594 |

*Primary Examiner*—T. E. Lynch
*Attorney*—L. Lee Humphries, H. Fredrick Hamann and Richard J. Rengel

[57] ABSTRACT

A position control system is provided to position a rotatable shaft coupled to a servomotor controlled sequentially by individual ones of a phase ordered group of feedback signals supplied by a resolver also coupled to said shaft. Logic circuitry provides steering signals for sequential gating of said feedback signals at a rate corresponding to the desired angular velocity of the shaft. The invention herein described was made in the course of or under a contract or subcontract thereunder, with the Air Force.

7 Claims, 6 Drawing Figures

INVENTOR.
GEORGE B. COTTRELL $$\frac{E_o}{E_{in}} = F(s)$$

INVENTOR.
GEORGE B. COTTRELL
BY
ATTORNEY

POSITION CONTROL SYSTEM RESOLVER

This is a continuation of U.S. Pat. application Ser. No. 14,405, filed Feb. 26, 1970, and now abandoned.

BACKGROUND OF THE INVENTION

In feedback control systems for providing rotational displacement of a shaft assembly to a desired angular position at a controlled rate, many of the prior art systems employ an electrical or mechanical tachometer to supply a rate control signal proportional to shaft speed and a resolver which supplies a separate control signal for determination of the mechanical position of the shaft. Accordingly, these prior control systems involve individual feedback loops for dual mode control in which the control signal supplied by the tachometer to the speed control loop is a regulatory signal for reducing any speed error whereas the control signal supplied by the resolver to the position control loop is indicative of mechanical position for minimizing any position error. Because of the different control requirements for positioning of a shaft assembly at a controlled rate, it is difficult to transfer control between modes to satisfy the requirements of speed during rotation and positioning of the shaft assembly at the desired rate. Further, in a servo system having two control loops, ordinary compensation networks for the slewing servo, i.e., for integration of the position control signal to minimize position error, cannot be used because of interference with the tachometer derivative signal. For example, a shaft assembly in which slewing produces a spring torque, the position control loop is unable to compensate for initial torque upon transfer of control from the speed control loop. Accordingly, where stable nulls for angular positions in the resolver are separated by only one or several minutes of arc apart, the energy stored in the shaft assembly can cause rotation to an incorrect null before the time constant of the servo is capable of reducing the torque to position at the selected null.

In order to overcome the foregoing difficulties of these prior systems, it is desirable to provide a single mode of feedback in a control system for controlling both angular velocity and positioning of a shaft assembly and without the need of separate feedback control loops or transfer of control from one feedback to another feedback to provide for controlled rate of rotation or slew of a shaft assembly to a predetermined position.

SUMMARY OF THE INVENTION

In the preferred embodiment of the present invention, a position control system is provided for controlling both angular velocity and position of a shaft assembly by operation in single mode of feedback control. This arrangement eliminates the need of tachometer or other similar transducer for supplying a speed error signal and corresponding additional feedback control signal. As disclosed in detail hereinafter, a closed loop control system includes a resolver having mechanical input, for converting angular position of a servo motor shaft into an electrical signal in the feedback loop; and an excitation input for supplying a carrier to the resolver stator winding, for example. This resolver has a plurality of rotor windings for supplying sinusoidal envelopes of suppressed carrier modulated voltages, including at least sine-cosine functions of the shaft position, which are demodulated by phase sensitive detectors to produce a phase-ordered group of feedback signals. The feedback signals of the ordered group are supplied sequentially to the servo motor to drive the shaft and resolver rotor to the next null position thereof until the desired position is reached. Preferably, these feedback signals are uniformly displaced in phase and when selectively supplied to a servo amplifier and the servo motor, drives the rotor thereof sequentially to respective nulls or cross-over points of the ordered group of feedback signals.

The angle through which the shaft travels is proportional to the number of phase substitutions produced by the ordered group of signals and the shaft velocity is proportional to the frequency of the phase substitutions. Clockwise or counterclockwise direction of shaft movement is controlled by selective sequential gating of signals of the ordered group, i.e., in forward or reverse sequence. Accordingly, a single mode of operation in a closed servo-loop provides both control of angular velocity as well as angular position of the shaft assembly. It is an object, therefore, of the present invention to provide a control system having the foregoing features and advantages.

Another object of the present invention is the provision of an improved position control system.

A further object is to provide an improved control system for rotation of an element at a controlled rate.

Still another object is the provision of a single mode of control for positioning a movable member at a controlled rate.

Another object of the present invention is to provide digital control in feedback control system for selection of phased control signal of an ordered group of signals for angular positioning of a rotatable element.

Other objects and features of the invention will become apparent to those skilled in the art as the disclosure is made in the following detailed description of a preferred embodiment of the invention as illustrated in the accompanying sheets of drawings.

DESCRIPTION OF THE PREFERRED EMBODIMENT

Figure 1:
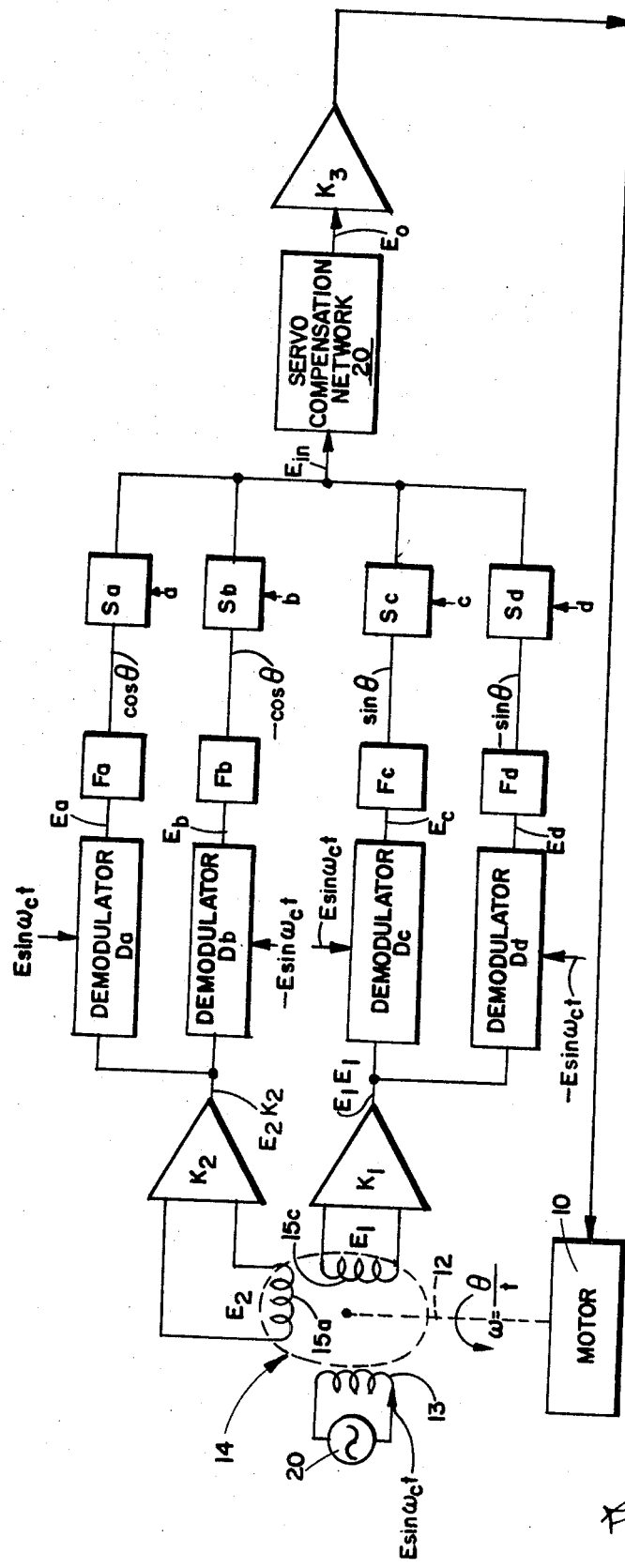
FIG. 1 is a schematic block diagram of the preferred embodiment of the analog position control system of the present invention.
Figure 1B:
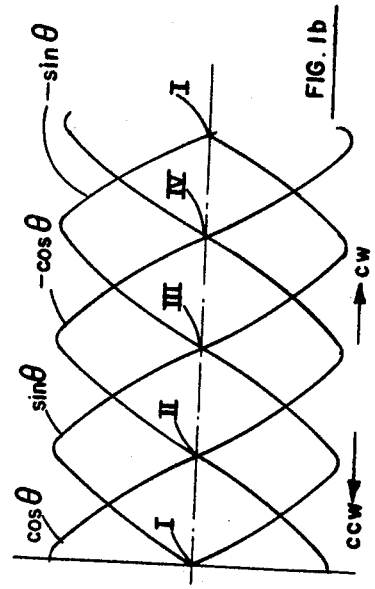
FIG. 1b are typical waveforms of an ordered group of control signals in the feedback loop having the desired uniform phase relation including cosine, sine, −cosine and −sine waveforms provided in the demodulation of position control signals in the feedback loop of FIG. 1.

Referring now to the drawings for a more detailed description of the preferred embodiment, in FIG. 1, a servo motor 10 drives a rotatable shaft 12 coupled to a resolver 14 by sequential feedback of an ordered group of feedback control signals of different voltage phases, as shown in FIG. 1b. These signals, derived from resolver 14, are selectively applied in a sequential manner to the servo-motor 10 from individual demodulators D$a$, D$b$ and D$c$, D$d$ by logical steering, i.e., gating through switching circuits on gates S$a$, S$b$ and S$c$, S$d$ respectively to the servo-motor 10. Logical steering signals $a$, $b$, $c$, and $d$ provide for selective gating of individual ones of the ordered group of feedback signals (FIG. 1b) by logic circuitry, shown in FIG. 2, to drive the servo-motor 10 and shaft 14 sequentially to null positions I, II, III, IV corresponding to crossovers of sinusoidal-cosinusoidal waveforms of the control signals shown in FIG. 1a. The rate at which the steering signals are supplied from counter 16 (FIG. 2) to gates S$a$, S$b$, S$c$ and S$d$, respectively, determines the angular velocity of the shaft 12. The rate of these signals is dependent in turn upon the rate of pulses, e.g. clock pulses C provided by digital computer 18 angular velocity of shaft 14. The final angular positioning of shaft 12 is determined by an address stored in shift register 17 which is decremented in down-counter 18 to zero to disable gate 19 at the address of the final position of shaft 12. Thus, the phase ordered group of signals Cos $\theta$, sin $\theta$, −Cos $\theta$, −Sin $\theta$ (FIG. 2c) are sequentially gated or steered to servo-motor 10 until the desired angular position of the shaft 12 is reached as specified by the address stored in the shift register 17.

Referring now more particularly to FIG. 1 for a more detailed description of the preferred embodiment, the rotatable shaft 12 is coupled to a resolver 14 which receives an excitation signal E sin $w_c t$ applied to stator windings 13 from a carrier generator 20. The resolver 14 includes a pair of output windings 15$a$, 15$c$ having outputs E$_2$ and E$_1$ for deriving individual suppressed carrier signals that are directly proportional to the sine and cosine, respectively, of the angular position of the shaft 12. The sine output E$_1$ is coupled to amplifier K$_1$ and to demodulators D$c$, D$d$ and the cosine output E$_2$ is applied to the amplifier K$_2$ having its output coupled to demodulators E$a$ and E$b$. Demodulators D$a$ and D$c$ receive as their second inputs, a reference signal (E sin $w_c t$) from carrier generator 20; and demodulators D$b$ and D$d$ receive as their second input reference signal −E sin $w_c$ $t$ from a 180° phase shifter (not shown) which is driven by carrier generator 20. The two amplifiers K$_1$ and K$_2$ provide a high impedance termination to the resolver output voltages E$_1$ and E$_2$ to increase each signal's scale factor linearly and provide a very low output impedance to drive the demodulators D$c$, D$d$ and D$a$, D$b$, respectively. The demodulators D$a$ to D$d$ are phase sensitive demodulators and the output of amplifiers K$_1$ and K$_2$, i.e., E$_1$ K$_1$ and E$_2$ K$_2$ are demodulated by multiplying each with reference signals E sin $w_c t$ and −E sin $w_c t$ as shown in FIG. 1, to provide demodulated outputs E$a$, E$b$, E$c$ and E$d$.

The outputs of demodulators D$a$, D$b$, D$c$, D$d$ are coupled to gates S$a$, S$b$, S$c$ and S$d$ respectively, through low pass filters F$a$, F$b$, F$c$, F$d$. Steering signals $d$, $a$, $c$, $b$ applied in that sequence to the gates S$d$, S$a$, S$c$, S$b$ to position shaft 12 sequentially at positions corresponding to null positions I, II, III, IV respectively, of servo motor 10 and cross-overs of sine and cosine signals illustrated in FIG. 1b. Compensation network 20, described hereinafter in greater detail in connection with FIG. 3, in response to input E$_{in}$ provides an output E$_o$ to servo amplifier K$_3$. Servo amplifier K$_3$ provides compensated servo signals to servo motor 10 which is responsive to a series thereof to drive the shaft 12 to the desired angular position as determined by the address corresponding to the final null position for the servo motor 10.

Figure 2:
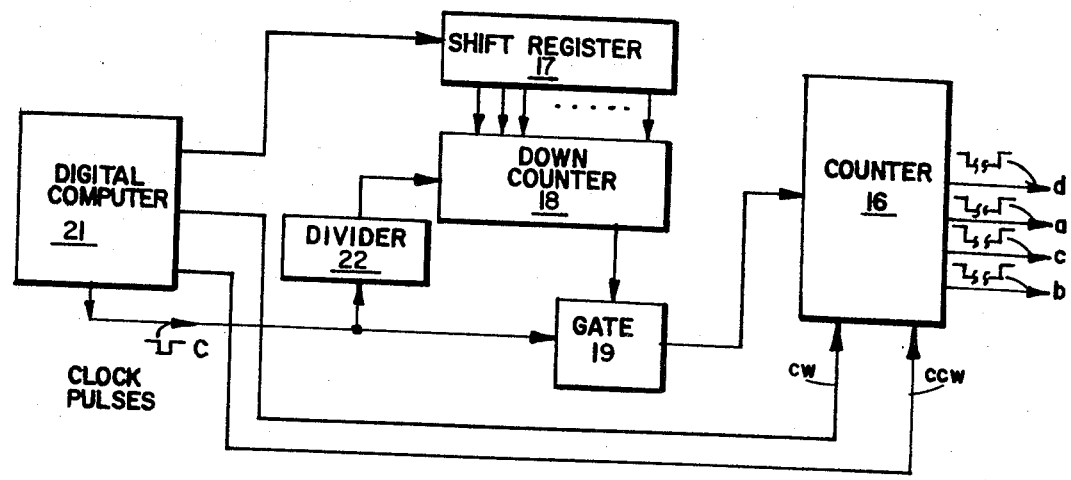
FIG. 2 is a schematic block diagram showing the logic arrangement for selectively gating the individual control signals of the ordered group at a desired rate to angularly position the shaft assembly.

Referring now to FIG. 2, the steering signals $d$, $a$, $c$, $b$ provide for sequentially gating the phase ordered group of signals to the corresponding gates shown in FIG. 1. These steering signals are produced by the output of counter 16 on corresponding output lines. The counter 16 is driven by clock pulses C provided by digital computer 21 and passed by gate 19 to the counter pulse input. The rate at which the phase ordered group of signals are gated depends upon the rate at which the clock pulses C drive the counter 16 to the final position of the shaft 12 as determined by the address supplied from the computer to the shift register 17 and stored in down counter 18. As shown in FIG. 2, clock pulses are coupled to the down counter 18 through a divider circuit 22 which provides factoring for the address corresponding to incremental positioning of the shaft 12 i.e., the four phase ordered signals having corresponding null position I, II, III, and IV. In addition, inputs $cw$ and $ccw$ to counter 16, supplied by the computer 21, control the direction of counting, i.e., up or down respectively, for clockwise and counter clockwise rotation of shaft 12. Input-output circuits of computer 21 provide the inputs $cw$, $ccw$ to counter 16, supplied by the computer 21, control the direction of counting, i.e., up or down respectively, for clockwise and counter clockwise rotation of shaft 12. Input-output circuits of computer 21 provide the inputs $cw$, $ccw$ to counter 16.

Figure 1A:
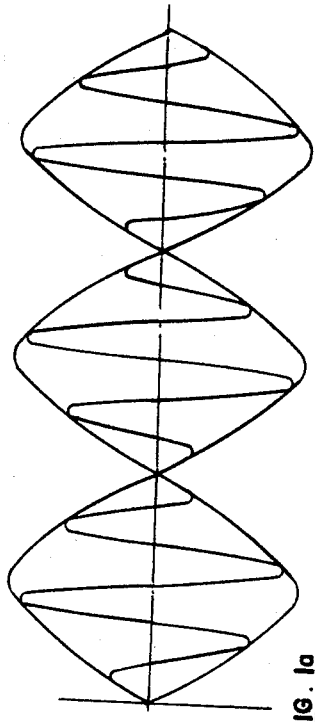
FIG. 1a is a typical waveform of a suppressed-carrier modulated sinusoidal output voltage showing phase reversal of the carrier frequency at the zero crossover as provided by the analog resolver illustrated in the preferred embodiment of FIG. 1.

A single mode of operation is provided such as to position the servo motor 10 whereby integration in the servo compensation network 20 retains the previous initial condition of the feedback loop. In operation, therefore, a single mode position control has been provided in which a resolver 14 provides for accurate positioning of the shaft 12 to 2.63 minutes of arc and a shaft speed ($w = \theta/t$) of 8° per second, for example. Accordingly, resolver 14 includes a multiple-pole stator 13 to which the source of excitation 20 is coupled to provide, for example, 4,096 electrical cycles per shaft revolution. Also, resolver 14 can provide three desired control signals by a combination of multi-poles and gear ratio and/or optical electrical resolver implementation to produce the desired electrical cycles per revolution of shaft 12. Accordingly, adjacent suppressed carrier envelope zero crossovers are provided at approximately 2.63 minutes of arc apart as shown in FIG. 1a. According to the assumed exemplary multiple-pole construction of the resolver the envelope frequency being 4,096 times the shaft frequency, the cycle time of the sinusoidal envelope wave form shown in FIG. 1a is approximately 91 cycles per second (cps). The suppressed carrier shown within the envelope is (E sin $w_c t$)(sin 4096 $w_s t$) where $w_c$ is the resolver excitation frequency and $w_s$ is the shaft velocity. The voltages at the outputs $E_1$ and $E_2$ are: $E_1 = (E \sin w_c t)(\sin 4096 w_s t)$ and $E_2 = (E \sin w_c t)(\cos 4096 w_s t)$. Signals $E_1$ and $E_2$ are amplified and demodulated by phase sensitive demodulators by multiplying each by the reference signals $E \sin w_c t$ and $-E \sin w_c t$. The output of demodulators $Da-Dd$ are $Ea-Ed$ which are represented as follows:

$$Ea = E \sin w_c t \times \cos 4096 \, w_s t \times E \sin w_c t$$

$$Eb = E \sin w_c t \times \cos 4096 \, w_s t \times (-E \sin w_c t)$$

$$Ec = E \sin w_c T \times \sin 4096 \, w_s t \times E \sin w_c t$$

$$Ed = E \sin w_c t \times \sin 4096 \, w_s t \times (-E \sin w_c t)$$

Expanding:

$$Ea = E^2 \sin^2 w_c t \times \cos 4096 \, w_s t$$

but $\sin^2 w_c t = \frac{1}{2} - \frac{1}{2} \cos 2w_c t$ thus, the term $-E^2/2 \cos 2 w_c t \cos 4096 \, w_s t$ is a high frequency voltage which is filtered by filter $Fa$ and the remaining signal available at gate $Sa$ is $E^2/2 \cos 4096 \, w_s t$ or $Ka \cos \theta$ where $Ka = E^2/2$ and $\theta = 4096 \, w_s t$.

The signals available at the outputs gates $Sa-Sd$ provide for selective coupling of the demodulated signals shown in FIG. 1b to the servo motor 10. As a result, the null position I can be selected by enabling gate $Sd$ to pass the demodulated signal $-\sin \theta$ which will energize the servo motor 10 to move to the zero crossover at null position I and the corresponding shaft position.

Referring to FIG. 2, for a description of the operation thereof, it was noted earlier that the counter 16 continues to provide steering signals $d, a, c, b$ to the corresponding gates $Sd, Sa, Sc, Sb$ until the gate 19 is disabled at zero count down of the address in the down counter 18. Accordingly, gates $Sd, Sa, Sc, Sb$ are sequentially gated to provide the sine-cosine outputs indicated in FIG. 1b as the servo motor 10 responds to each of the sequentially gated signals $-\sin \theta, \cos \theta, \sin \theta, -\cos \theta$. As a result, motor 10 will move from sequential null position I, II, III, and IV until the down counter 18 is decremented to zero at which time the servo motor 10 will stop at null position I, for example, to position the rotatable shaft 12 at the address stored in the shift register 17. When it is desired to move the shaft 12 to a new final position, a new address is stored in the shift register 17 and the down counter 18 is reset to provide an enabling output to the gate 19 for gating the clock pulses C to step counter 16 in either clockwise or counterclockwise direction depending upon the output on lines cw or ccw which causes the counter 18 to count up or down, respectively. In accordance with the exemplary operation for positioning a shaft at a desired address, it is assumed that the shaft velocity $\theta/t$ is 8° per second and the desired position is 1796th null position out of the total of 4096, i.e., a selected address of 1796 and a velocity $\theta/t$ is controlled by a clock pulses having a repetition rate of 364 cps. Counter 16, in this embodiment, is a 4 bit counter; the first 2 bits provides a "divide by 4" and the last two bits, when their outputs are logically combined, provide the signals $a, b, c, d$. The output pulses $a, b, c, d$ of counter 16 at the 91 cps rate, will cause gates $Sa-Sd$ to pass an ordered repetitive grouping which in turn advances the shaft position by 1/4096 times 360° by each iteration at the 91 cps rate for a shaft velocity $\theta/t$ of 8° per second. For different angle velocities required, the clock pulse rate must be varied accordingly assuming the exemplary feedback circuit arrangement is retained at 4096 electrical cycles per shaft revolution although various combinations are readily apparent in view of the foregoing description of the preferred embodiment.

A complete cycle of operation involves driving the rotor of servo motor 10 to a final position or reference point, i.e., a hard stop on the axis of rotation. At the shaft position, for example, address (1796) corresponding to a null position, the 12 bit binary word (001110000010), is serially loaded into the shift register 17 from the computer 21 and subsequently is parallel shifted from the shift register 17 to the down counter 18 including a 12 bit storage. The angular position selected, according to this address 1796, equals 158° which is derived by placing 1796 over 4096 null positions. At the rate of 8° per second, the shaft 12 will be positioned at this address in 19.75 seconds traversing an angle of 158° in that time interval. During this interval, the gate 19 remains enabled until the down counter 18 is cleared (in the period of 1796 clock pulses corresponding to the time interval of 19.75 seconds). The pulse rate to the down counter 18 can be adjusted by the divider 22 which provides operation at 91 cps by dividing the clock pulse rate of 364 c.p.s. by 4.

In view of the foregoing, it should be made clear that the phase ordered group provided by the resolver 14 and demodulators $Da-Dd$, shown in FIG. 1, could include a larger number of output windings at different voltage phases to provide null positions I to VIII, for example, which would require an additional pair of stator windings (in addition to windings 15a, 15c) disposed to produce null positions between each of the null positions I, II, III, and IV. In any event, the different voltage phases of the multiple resolver 14 are logically steered in a properly ordered grouping such that each phase selected causes a resulting voltage, when supplied to the servo amplifier $K_3$, to drive servo motor 10, shaft 12 and resolver 14 to a corresponding null position, sequentially to null positions, and to a final null position specified by the address in shift register 17. As a result thereof, the servo motor 10 serves to position the shaft 12 at the null position corresponding to the crossover of the gated control signal and the next control signal in the properly ordered group of voltage phases is sequentially applied, causing the servo motor 10 to drive to the next null position (which is shown in the preferred embodiment of FIG. 1b to be at the 90° electrical displacement). This incremental positioning at the desired repetition rate continues until the shaft 12 has been rotated to the desired final position, according to the address, and the distance of travel is proportional to the number of phase substitutions wherein the angular velocity is proportional to the frequency of the phase substitutions. Thus, this feedback circuit provides for driving rotatable shaft 12 to a precise, predetermined angular position at a precise predetermined angular rate without the need for tachometers or other additional feedback control loops providing switch-over in the modes of control.

Figure 3:
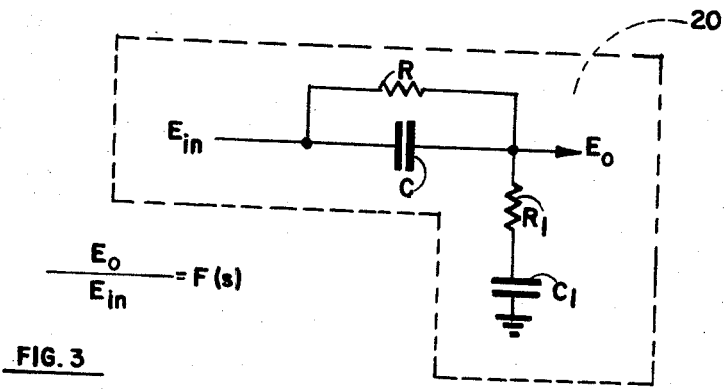
FIG. 3 is a schematic diagram of a servo compensator integration circuit which provides a transfer function required for precise positioning and stability of the servo motor in the preferred feedback control system.
Figure 3A:
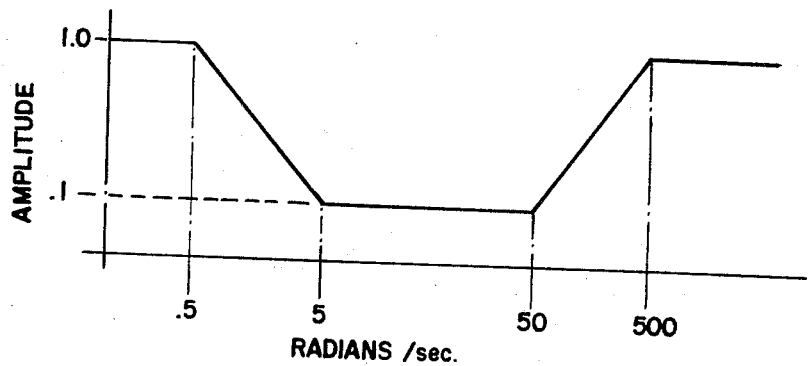
FIG. 3a is frequency response curve for the circuit shown in FIG. 3.

Referring now to FIG. 3, servo compensator circuit 20 is shown to provide a transfer function where S is the La Place operator and the break frequencies, for example, are required to afford integration for positive position accuracy and derivative action for servo motor stability. The circuit is shown to include the resistor capacitor network as shown in FIG. 3 which provides the desired asymptotic frequency response shown in FIG. 3a.

In the light of the above teachings, of the preferred embodiment disclosed various modifications and variations of the present invention are contemplated and will be apparent to those skilled in the art without departing from the spirit and scope of the invention.

I claim:

1. A position control system comprising:
    a resolver having at least one stator winding and a rotor on which is mounted at least two rotor windings, said stator winding adapted to be energized by an alternating potential to induce a voltage in each of said rotor windings to provide an output voltage from each of said rotor windings which output voltages are sinusoidal and are proportional to the sine and cosine, respectively, of the rotor's angle with respect to the stator;
    a shaft fixedly mounted to said rotor;
    means for receiving said output voltages and for producing signals proportional to the positive and negative values of said output voltages;
    logic means for receiving a position signal corresponding to the desired final position of said rotor shaft and for sequentially gating said positive and negative signals to a logic output with the total number of gated signals being proportional to the difference between the rotor shaft's actual position and the desired final position; and
    servo means for receiving the sequentially gated signals at the output of said logic means and for driving said shaft so as to sequentially null each of the received gated signals.

2. The system according to claim 1 wherein said logic means includes means for producing gating signals at a desired rate for regulating the rate of movement of said member between each adjacent null position.

3. The invention according to claim 1 wherein each of said rotor windings produce a sinusoidal signal having a series of zero crossover for each cycle of rotation of said rotor shaft to provide a series of corresponding stable angular positions within each cycle of rotation of said rotor shaft.

4. The system according to claim 3 wherein said logic means sequentially gates individual sinusoidal signals to angularly position the rotor shaft at locations corresponding to the zero crossover.

5. The system according to claim 4 in which said logic means includes counter circuit means providing forward and reverse operation for producing clockwise and counterclockwise rotation of said shaft.

6. The system according to claim 4 in which said logic means includes circuit means for providing steering signals at a desired repetition rate for controlling the angular velocity of said shaft.

7. The system according to claim 4 in which said logic means includes an address register for gating a predetermined number of steering signals for controlling the final position of said shaft.

* * * * *